United States Patent
Faihe et al.

(10) Patent No.: US 9,723,052 B2
(45) Date of Patent: Aug. 1, 2017

(54) UTILIZING CONTENT VIA PERSONAL CLOUDS

(75) Inventors: Yassine Faihe, Champagnier (FR); Yves Del Medico, Grenoble (FR); Francois-Xavier Kowalski, Lumbin (FR); Agnieszka Thonet, Meylan (FR); David Penkler, Claix (FR); Rajiv Puranik, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 203 days.

(21) Appl. No.: 13/981,263

(22) PCT Filed: Jan. 28, 2011

(86) PCT No.: PCT/US2011/022944
§ 371 (c)(1),
(2), (4) Date: Jul. 23, 2013

(87) PCT Pub. No.: WO2012/102731
PCT Pub. Date: Aug. 2, 2012

(65) Prior Publication Data
US 2013/0297739 A1 Nov. 7, 2013

(51) Int. Cl.
*G06F 15/16* (2006.01)
*H04L 29/08* (2006.01)
*G06Q 50/00* (2012.01)
*G06Q 10/10* (2012.01)

(52) U.S. Cl.
CPC ........... *H04L 67/02* (2013.01); *G06Q 10/101* (2013.01); *G06Q 50/00* (2013.01)

(58) Field of Classification Search
CPC ....... H04L 67/02; H04L 67/10; G06Q 10/101; G06Q 50/00
USPC .................................................. 709/217–219
See application file for complete search history.

(56) References Cited

U.S. PATENT DOCUMENTS

| 7,680,835 | B2 | 3/2010 | MacLaurin et al. |
| 7,725,431 | B2 | 5/2010 | Myllyla et al. |
| 7,734,826 | B2 | 6/2010 | Brown et al. |
| 7,761,531 | B2 | 7/2010 | Johnson et al. |
| 2003/0083755 | A1* | 5/2003 | Denoual ........... G06F 17/30905 700/2 |
| 2006/0206533 | A1* | 9/2006 | MacLaurin et al. .......... 707/200 |
| 2009/0100134 | A1 | 4/2009 | Svennarp |
| 2010/0010944 | A1* | 1/2010 | Cheng et al. .................. 706/12 |

(Continued)

FOREIGN PATENT DOCUMENTS

| CN | 1722128 A | 1/2006 |
| CN | 102089776 A | 6/2011 |
| KR | 20100107113 | 10/2010 |

OTHER PUBLICATIONS

International Seaching Authority, international Search Report and Written Opinion, PCT/US2011/022944, Date Mailed Oct. 12, 2011.

*Primary Examiner* — Aftab N. Khan
(74) *Attorney, Agent, or Firm* — HP Inc. Patent Department

(57) ABSTRACT

Example embodiments disclosed herein relate to processing content using a personal cloud. One of a plurality of content items respectively associated with a plurality of devices of a personal cloud is determined. A processing to be performed on the one content item is determined. The processed version of the one content item is determined.

14 Claims, 6 Drawing Sheets

(56) References Cited

U.S. PATENT DOCUMENTS

| | | | |
|---|---|---|---|
| 2010/0325191 A1 | 12/2010 | Jung et al. | |
| 2010/0332401 A1 | 12/2010 | Prahlad et al. | |
| 2011/0047214 A1* | 2/2011 | Lee et al. | 709/204 |
| 2011/0110604 A1 | 5/2011 | Reddy et al. | |
| 2011/0173337 A1* | 7/2011 | Walsh et al. | 709/229 |
| 2011/0252160 A1* | 10/2011 | Wu | G06F 17/227 709/246 |

* cited by examiner

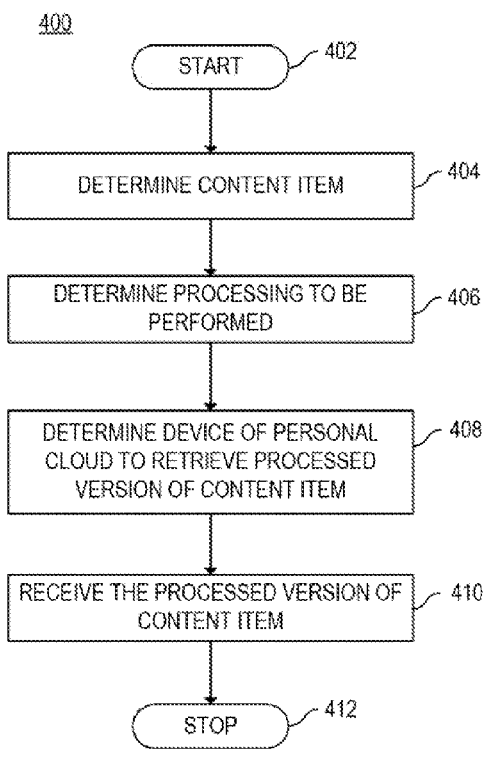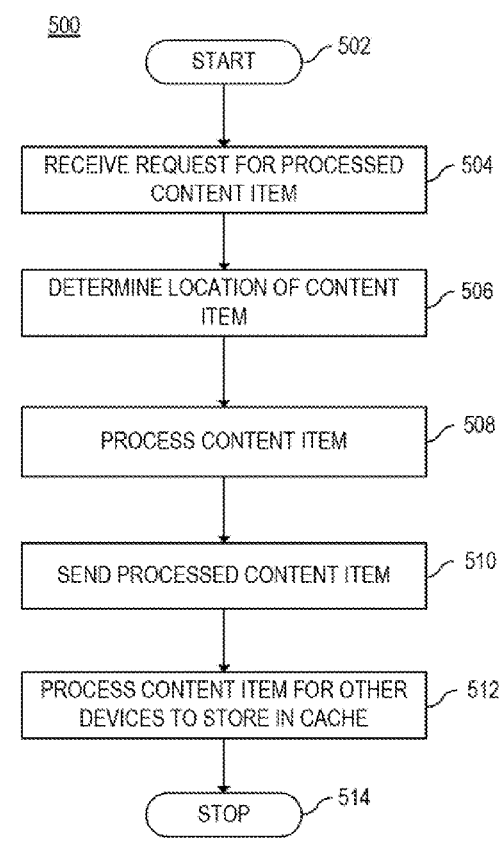
*FIG. 4*  *FIG. 5*

UTILIZING CONTENT VIA PERSONAL CLOUDS

BACKGROUND

Service providers and device manufacturers are challenged to deliver quality and value to consumers, for example by providing storage services to users. Many users today utilize a great deal of digital content over various devices. However, many users of services do not wish to allow service providers direct access to their digital content. As such, service providers and device manufacturers are challenged to provide services to facilitate usage of digital content without access to the digital content.

BRIEF DESCRIPTION OF THE DRAWINGS

The following detailed description references the drawings, wherein:

FIG. 4 is a flowchart of a method for utilizing processing capabilities of a personal cloud, according to one example;

FIG. 5 is a flowchart of a method for providing processing capabilities for a personal cloud, according to one example;

DETAILED DESCRIPTION

Users of devices today interact with a large amount of data such as digital content. Advances in technology, content creation tools, and content publishing tools has increased the ability of users to utilize devices to compute, store, and utilize content. Additionally, many users now utilize multiple computing devices in everyday life. For example, a user may utilize a laptop for home use, a laptop for work use, a cellular phone, a desktop computer, a tablet device, a slate device, or combinations thereof. As a result, content interesting to the user can be scattered across multiple devices. To access content that the user wishes to utilize, the user may have to remember the location of where the content is stored and physically utilize the device containing the content.

Further, when a user wishes to utilize content, the content may benefit from processing. This can occur, for example, if the device that the user wishes to utilize has a limited screen size, is incompatible with a media type associated with the content, or the like. Moreover, the user may wish to process content while utilizing a device unable to process the content or a device that it would be inefficient to process content at. For example, a user may wish to have the device (e.g., a mobile device) that the user is utilizing delegate content processing to a device (e.g., a desktop computer) having more appropriate capabilities (e.g., software, computing power, power supply, etc.). Additionally, the user may wish to utilize a personal cloud to perform such actions to be more assured of privacy and security. Accordingly, various embodiments disclosed herein relate to utilizing a personal cloud to process content for a device being utilized by a user.

Figure 1:
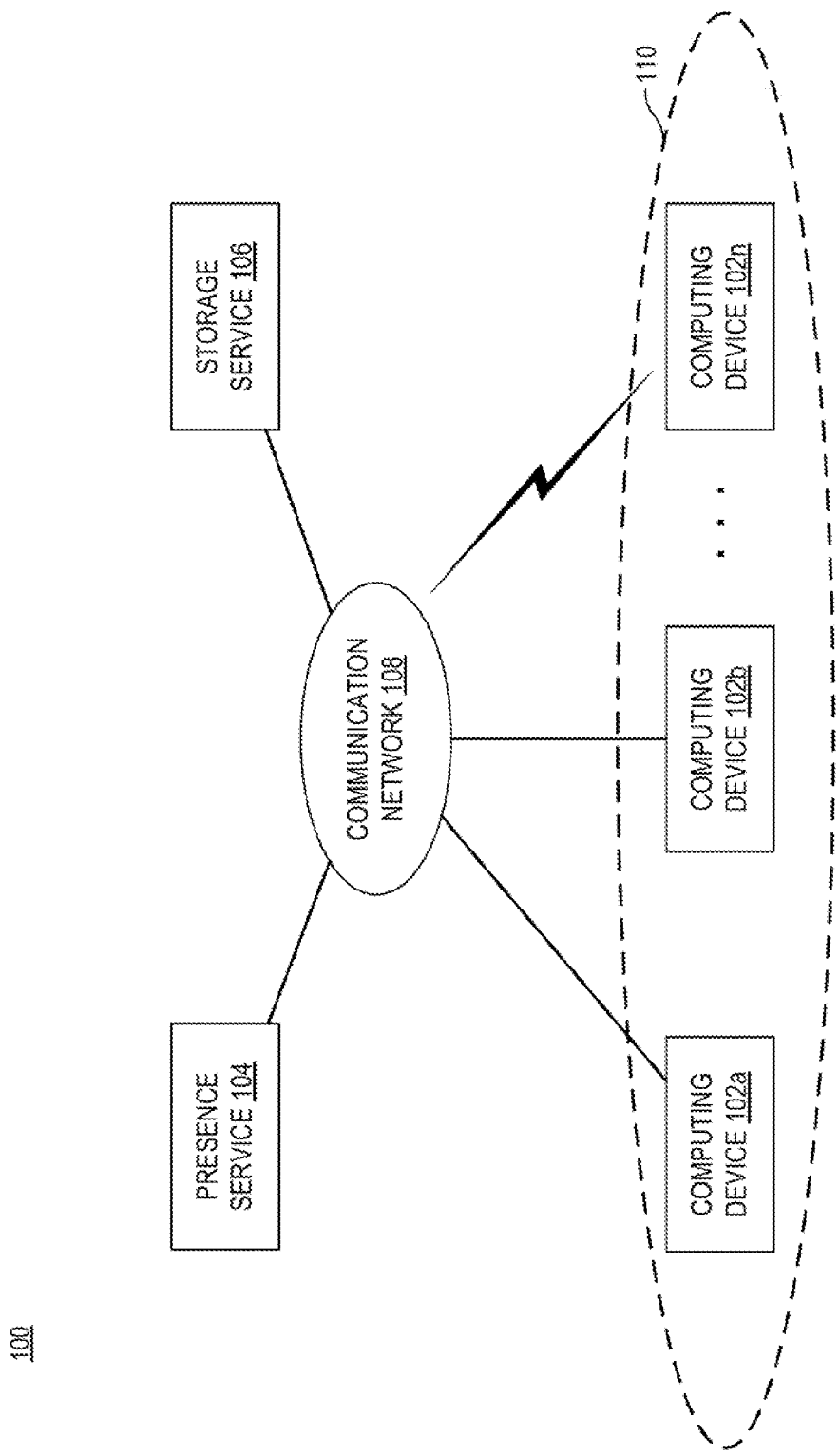
FIG. 1 is a system diagram of components utilized to implement a personal cloud, according to one example.

Referring now to the drawings, FIG. 1 is a system diagram of components utilized to implement a personal cloud, according to one example. The system 100 can include computing devices 102a-102n. The system 100 can further include, for example, a presence service 104 and a storage service 106. The computing devices 102a-102n, presence service 104, and storage service 106 can be connected via a communication network 108. Further, the computing devices 102a-102n can be a part of a personal cloud 110. In certain embodiments, the personal cloud 110 is a group of computing devices 102 belonging to a user or set of users that can interact with each other to provide capabilities (e.g., processing capabilities, storage capabilities, etc.) among the devices. The computing devices 102 can be associated with each other utilizing an identifier, account information, etc.

The communication network 108 can utilize wired communications (e.g., connections to computing device 102a and 102b), wireless communications (e.g., the connection to computing device 102n), or combinations thereof. Further, the communication network 108 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc.

As previously noted, a user of a computing device 102a may wish to utilize a content item that would benefit from processing at another device of the users personal cloud 110. The user may utilize a personal cloud 110 because the user may not wish to allow an external service to perform such processing, for example, to ensure the privacy of the user. In certain examples, a content item is an electronic file that can be processed by a computing device 102 to provide information to a user. Content items can include media items, such as images, video files, audio files, or the like. Further, the content item the user wishes to utilize may be located on another computing device (e.g., computing device 102b). The user or an application executing on the computing device 102a can utilize a metadata index of content items associated with the personal cloud to select the content item.

The computing devices 102 can each include a local metadata index for each of the content items associated with the personal cloud 110. A local metadata index can include an identifier of each computing device 102 as well as identifiers associated with the respective content items available on the respective computing devices 102. The metadata can further include additional information, for example, file types, display parameters (e.g., form factors, resolution, etc.) for media items, or the like. These indexes can be updated utilizing the computing devices 102. When a computing device 102a receives a new content item, updates a content item, deletes a content item, modifies a content item, or the like, the computing device 102a can send an update message to each of the computing devices 102 with metadata information about the change. The computing devices 102 can then update their respective local metadata indexes based on the information.

The presence service 104 may be utilized to facilitate communications between computing devices 102 of the personal cloud 110. The presence service 104 can be present on a computing device of the personal cloud or another service on a server external to the cloud. The presence service 104 can provide updated location information associated with the computing devices 102. As such, when a computing device 102 changes locations (e.g., changing Internet protocol address locations) from which the computing device 102 can be reached, the computing device 102 can send an update message to the presence service 104, which can store the updated location information. The presence service 104 can update the computing devices 102 of the updated location information periodically, based on an event system (e.g., when new information is gathered), a combination thereof, or the like. Further, the presence service 104 may periodically request for updated location information from computing devices 102.

When the computing device 102*a* selects a content item to be processed, the location of the content item can be determined utilizing the local metadata index. Further, the computing device 102*a* can determine a processing to be performed on the content item. This can be accomplished by allowing the user to select the processing (e.g., by displaying an option and receiving an input), by having the processing be determined by an application utilizing the personal cloud, or the like. Processing of a content item can be a modification to the content item. The processing can include filtering, image processing (e.g., red-eye removal, image resiting, etc.), audio processing, video processing (e.g., resolution changes, codec changes, etc.), or the like. Further, the processing can be performed by the other computing device 102*b* based on a profile of the computing device 102*a*.

The computing devices 102 can include a devices profile of the computing devices 102 in the personal cloud. A devices profile can include information about the respective computing devices 102. For example, the devices profile can include information as to the processing capabilities of the respective devices, the resolution of a display associated with the device, software capabilities, power information (e.g., battery information associated with mobile devices), or the like. The devices profile can be utilized in the selection of a device to retrieve a processed content item from. Further, the devices profile can be utilized by the other computing device 102*b* to process a content item automatically for the computing device 102*a*. For example, the other computing device 102*b* may process an image content item based on the resolution of the computing device 102*a*.

In one example, computing device 102*a* takes an image of a person using a camera component of the computing device 102*a*. The user may be provided a selection option to allow the user to have red-eye processing of the image performed on image content item. The user selects the red-eye processing option.

The computing device 102*a* then utilizes a local devices profile to determine one of the computing devices 102 of the personal cloud that can perform the processing. The computing device 102*a* determines that another computing device 102*b* has the requisite capabilities to perform the processing. This may be determined based on looking at the devices profile stored at the computing device 102*a*. The computing device 102*a* then sends the image to the other computing device 102*b* for processing.

The other computing device 102*b* receives the image as well as a request for the processing. The image is processed for red-eye removal and a processed version of the image is generated on the other computing device 102*b*. Then, the other computing device 102*b* can send the processed version of the image to the computing device 102*a*. Further, the other computing device 102*b* can update its local metadata index with the image and/or the processed image. The update can also be propagated to the other computing devices 102. Similarly, the computing device 102*a* may update its index.

In certain scenarios, the image or other content item is not available on the computing device 102*a*. As such, the computing device 102*a* does not send the content item to the computing device 102*b* performing the processing. A reference to the content item and the processing to be accomplished can be sent. The other computing device 102*b* can utilize its local metadata index to retrieve the content item prior to processing.

In one example, the local metadata index can show that the content item is stored on a particular computing device 102. In another example, the local metadata index can show that the content item is stored at a storage service 106. In certain scenarios, the storage service 106 can act as a virtual computing device of the personal cloud by being associated with an account or identifier of the personal cloud.

By way of example, the computing devices 102, the presence service 104, and the storage service 106 communicate with each other and other components with access to the communication network 108 via a communication protocol or multiple protocols. A protocol can be a set of rules that defines how nodes of the communication network 108 interact with other nodes. Further, communications between network nodes can be implemented by exchanging discrete packets of data or sending messages. Packets can include header information associated with a protocol (e.g., information on the location of the network node(s) to contact) as well as payload information.

Figure 2:
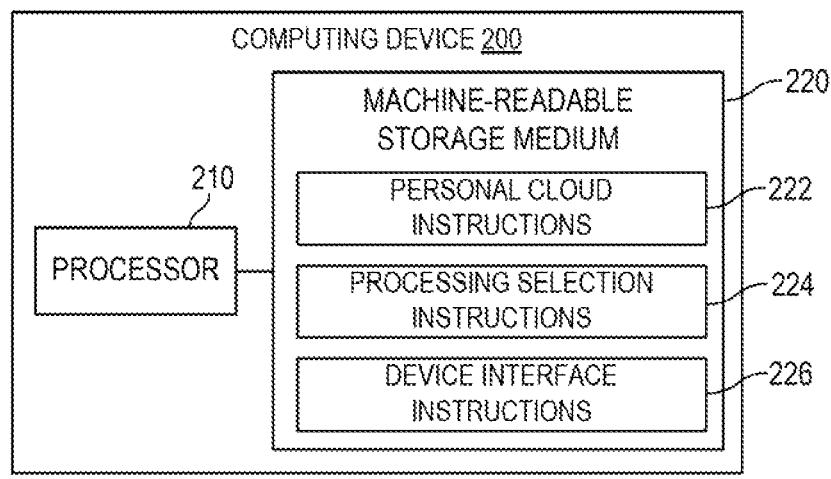
FIG. 2 is a block diagram of a computing device capable of utilizing processing capabilities of a personal cloud, according to one example.

FIG. 2 is a block diagram of a computing device capable of utilizing processing capabilities of a personal cloud, according to one example. The computing device 200 includes, for example, a processor 210, and a machine-readable storage medium 220 including instructions 222, 224, 226 for utilizing a personal cloud. Computing device 200 may be, for example, a notebook computer, a slate computing device, a portable reading device, a wireless email device, a mobile phone, a desktop computer, a tablet, a Personal Digital Assistant (PDA), another processing device, or a combination thereof.

Processor 210 may be, at least one central processing unit (CPU), at least one semiconductor-based microprocessor, at least one graphics processing unit (GPU), other hardware devices suitable for retrieval and execution of instructions stored in machine-readable storage medium 220, or combinations thereof. For example, the processor 210 may include multiple cores on a chip, include multiple cores across multiple chips, multiple cores across multiple devices (e.g., if the computing device 200 includes multiple node devices), or combinations thereof. Processor 210 may fetch, decode, and execute instructions 222, 224, 226 to implement the personal cloud system. As an alternative or in addition to retrieving and executing instructions, processor 210 may include at least one integrated circuit (IC), other control logic, other electronic circuits, or combinations thereof that include a number of electronic components for performing the functionality of instructions 222, 224, 226.

The machine-readable storage medium 220 (e.g., a computer-readable storage medium) may be any electronic, magnetic, optical, or other physical storage device that contains or stores executable instructions. Thus, machine-readable storage medium 220 may be, for example, Random Access Memory (RAM), an Electrically Erasable Programmable Read-Only Memory (EEPROM), a storage drive, a Compact Disc Read Only Memory (CD-ROM), and the like.

As such, the machine-readable storage medium 220 can be non-transitory. As described in detail below, machine-readable storage medium 220 may be encoded with a series of executable instructions for implementing the personal cloud.

Figure 6:
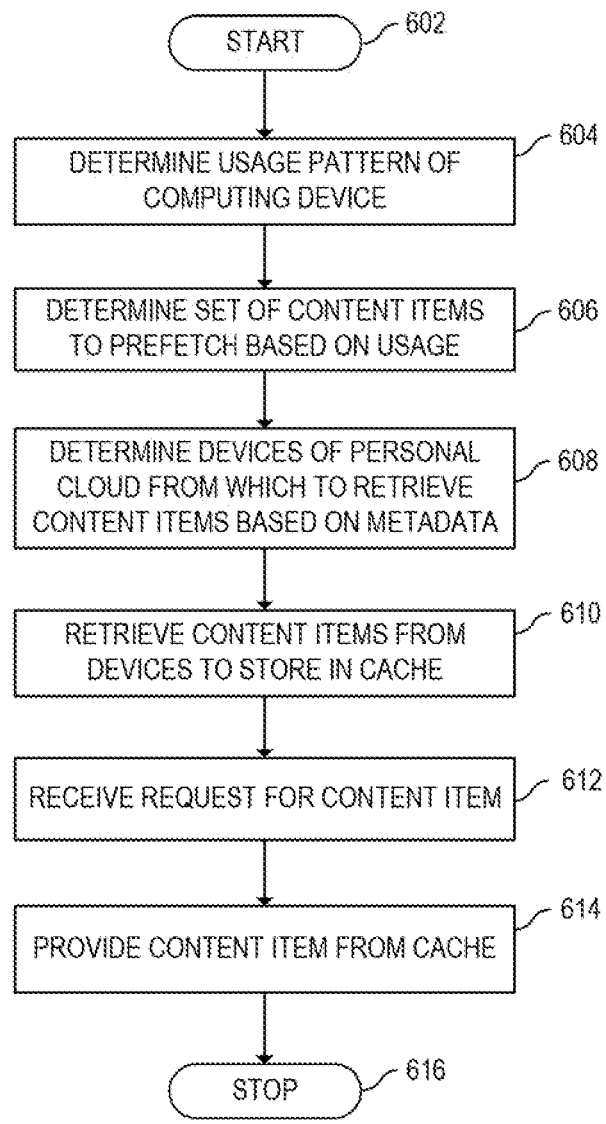
FIG. 6 is a flowchart of a method for prefetching content items from a personal cloud, according to one example.

Moreover, the instructions 222, 224, 226, if executed by a processor 210 (e.g., via one processing element or multiple processing elements of the processor) can cause the processor 210 to perform processes, for example, the processes of FIG. 4-FIG. 6. Personal cloud instructions 222 can be utilized to implement interactions between computing devices of the personal cloud. As such, the personal cloud instructions 222 can be utilized to generate and update a local index store of metadata associated with content items of the personal cloud. The personal cloud instructions 222 can further be utilized to determine devices of the personal cloud to retrieve content items from as well as devices of the personal cloud to process content items (e.g., based on a capability of the devices). The capabilities of devices may be stored in profile information associated with the devices. The profile information can be stored in data structures (e.g., a devices profile). A devices profile can be a single data structure or be separated into multiple data structures. In certain examples, a devices profile includes an identifier of each device, the capabilities of the device, and/or other information about the device. Capabilities of the device can include processing capabilities (e.g., a processing power rating), software capabilities (e.g., software that, when executed by the processor 210, can perform a processing function), power capabilities (e.g., power supply information), or combinations thereof.

In certain examples, the processing selection instructions 224 of the computing device 200 are utilized to determine a processing to be performed on a content item. The content item can be selected utilizing a user interface based on user input. Further, the content item can be selected by an application via an application programming interface (API) made available by the personal cloud instructions 222. Moreover, the application running on the processor 210 can determine processing to be performed on the content item. Additionally or alternatively, a user interface may be provided to the user to manually select a processing type.

Once a content item and processing to be performed are determined, the personal cloud instructions 222 can be utilized to determine at least one other computing device of the personal cloud that can be utilized to generate a processed version of the content item. The device interface instructions 226 can be executed to request and receive the processed version from the at least one other computing device. For example, the device interface instructions 226 may be executed to send a message to a determined computing device of the personal cloud to request a processed version of the content item.

Figure 3:
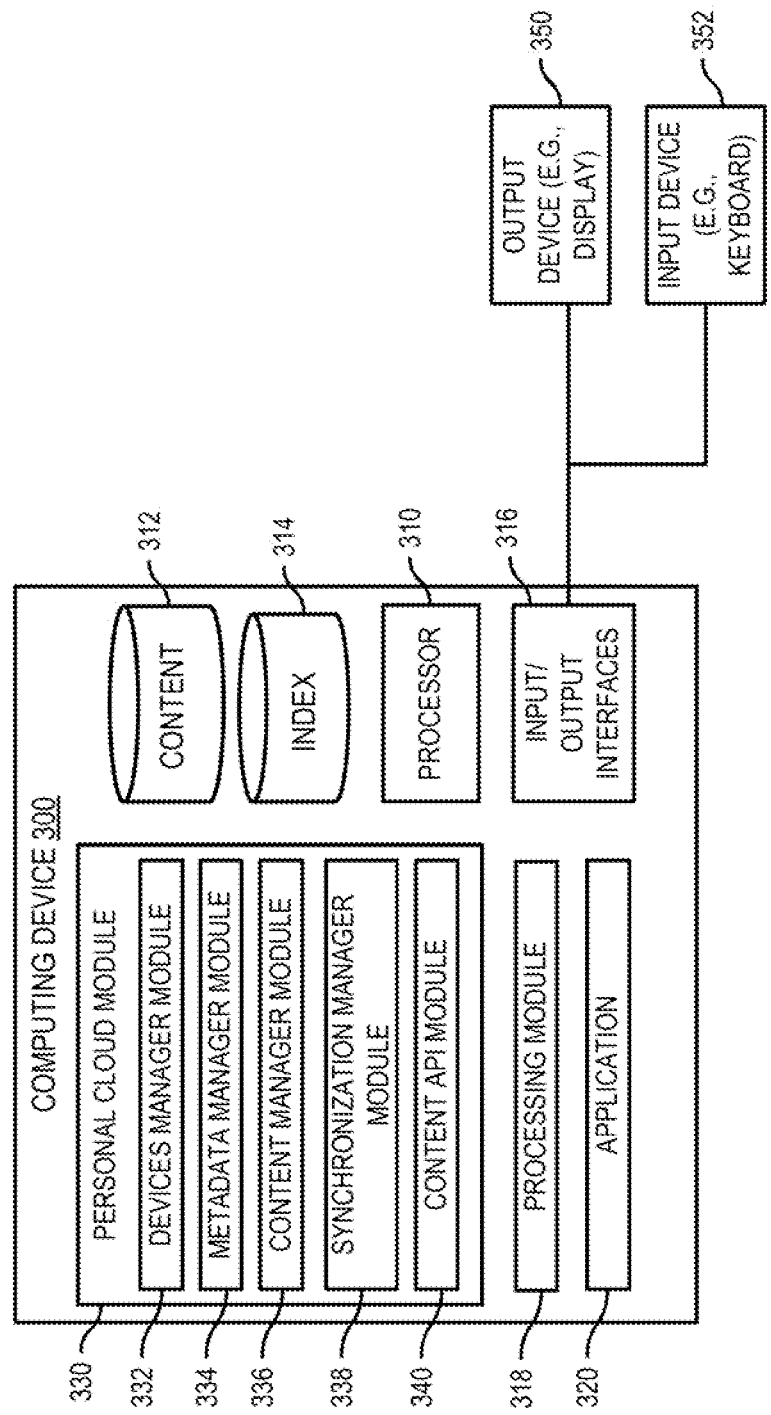
FIG. 3 is a block diagram of a computing device including modules for communicating with a personal cloud, according to one example.

FIG. 3 is a block diagram of a computing device including modules for communicating with a personal cloud, according to one example. In this example, the computing device 300 includes a processor 310, content 312, an index 314 of metadata of the content, input/output interfaces 316, a processing module 318, applications 320 that can execute on the processor 310, and a personal cloud module 330. The personal cloud module 330 can include a devices manager module 332, a metadata manager module 334, a content manager module 336, a synchronization manager module 338, and a content application programming interface (API) module 340 that can be utilized to implement a personal cloud system.

As detailed below, computing device 300 may perform the processes of FIG. 4-FIG. 6. Further, computing device 300 may be a notebook computer, a slate computing device, a portable reading device, a wireless email device, a mobile phone, a desktop computer, or any other device that can utilize a personal cloud. Processor 310 may be a CPU, GPU, or microprocessor suitable for retrieval and execution of instructions and/or electronic circuits configured to perform the functionality of any of the modules 330-340 described below.

As noted above, computing device 300 may include a series of modules 330-340 for utilizing a personal cloud. Each of the modules 330-340 may include, for example, hardware devices including electronic circuitry for implementing the functionality described below. In addition or as an alternative, each module may be implemented as a series of instructions encoded on a machine-readable storage medium of computing device 300 and executable by processor 310. It should be noted that, in some embodiments, some modules are implemented as hardware devices, while other modules are implemented as executable instructions.

The devices manager module 332 of the personal cloud module 330 can be utilized to connect to other computing devices of the personal cloud via input/output interfaces 316. In one example, the input/output interface 316 can hide a networking interface (e.g., Ethernet), a wireless networking interface, or the like that can be utilized to communicate with other devices via a communication network. Further, the devices manager module 332 may generate, maintain, and/or update a data structure (e.g., a list) of devices of the personal cloud. This data structure can additionally include a type of connection that is being utilized by the respective devices. The devices manager module 332 can additionally register the computing device 300 with a presence service to provide the location and up-to-date information about the computing device 300 to other devices in the cloud. Further, the devices manager module 332 can receive messages from the presence service indicating the locations, connections, and other device information of the other devices of the personal cloud. Additionally or alternatively, the device manager module 332 can request some of the device information directly from devices of the personal cloud.

In certain scenarios, the personal cloud module 330, when communicating with the presence service and/or other computing devices, can utilize an authentication method to ensure that information transferred is secure. An example of an authentication method includes beginning sessions between devices based on a username and/or password. A user interface can be presented to a user of the computing device 300 via an output device 350 such as a display, a projector, a printer, a messaging device, or the like. Further, the password, or other input can be received by the computing device via an input device 352 such as a keyboard, a mouse, a remote, a keypad, or the like. Additionally or alternatively, the computing device 300 may utilize devices for input and output (not shown), such as a touch screen interface, a networking interface (e.g., Ethernet), a wireless networking interface, etc. In some examples, other authentication methods can be utilized. For example, the username/password combination and/or a key or token can be stored on the computing device 300 that can be utilized for the authentication.

Content 312 can be generated, received, transmitted, utilized, etc. by the computing device 300. The content 312 can include content items such as image files, video files, electronic mail files, word processing files, or the like. As content items are generated, received, deleted, etc. by the computing device 300, the metadata manager module 334 can update an index 314 of metadata about the respective content items. In one example, the index can include a data structure that includes an identifier of the content item (e.g., a name of the file), a location of the content item (more than one location can exist if, for example, the content item is located on more than one computing device of the personal cloud), the type of content item (e.g., file extension), information associated with the content item based on the type of content item (e.g., an image may include resolution information, a video may include a codec, etc.), locations information of processed derivative content items based on the content item, combinations thereof, or other information about the content item. The index 314 can be composed of a table of information about the content items, include a list of content items with associated metadata information for each of the items, or organized in another data structure. The metadata manager module 334 further maintains monitored content items on the computing device 300.

Moreover, the metadata manager module 334 receives information about content items from the content manager module 336. The content manager module 336 may scan and/or monitor content within specific directory roots on storage of the computing device 300. These roots may be designated as sharing the content 312. Further, in certain scenarios, the content manager module 336 can be utilized to provide streaming content to another device of the personal cloud. This can be useful if, for example, a requesting device wishes to view content associated with a large media file, such as a video file. When the content manager module 336 finds changes to the content items, the changes can be reported to the metadata manager module 334 to update the index. Changes can include recognition of new content items, deletion of content items, modifications to the content items, etc.

Further, the metadata manager module 334 provides update information and receives updated information about content items on other computing devices of the cloud from the synchronization manager module 338. The synchronization manager module 338 receives updates from the metadata manager module 334 and publishes the information to other devices in the personal cloud. Further, the synchronization manager module 338 receives updates of local indexes of other computing devices of the cloud. In this manner, the locally stored index 314 includes updated information about content items on other devices of the personal cloud.

The content items utilized via the personal cloud module 330 can be provided to applications 320 of the computing device 300 via the content API module 340. An application can be a program that may be executed by the processor 310. The content API module 340 provides an interface including information about the index 314 (e.g., file names, file types, etc.) to the applications 320. An application 320 can utilize the content API module 340 to request and receive content items via the personal cloud module 330. Further, the personal cloud module 330 may provide a user interface to a user of the computing device 300.

In certain embodiments, the content manager module 336 can further be utilized to prefetch and/or cache content 312 stored on other devices of the personal cloud. For example, the content API module 340 can monitor requests for content by the user. The requests can be utilized to determine a usage pattern. The usage pattern can be used to select content to prefetch that is determined to be likely to be requested soon. In one example, the requested content usage pattern shows a traversal according to an alphabetical pattern. The content associated with the next sections of the alphabetical pattern can be prefetched from other devices. Other patterns can be utilized (e.g., by determining possible links to other content the user or application 320 may utilize next) to prefetch content 312 from other devices of the personal cloud. Further, when the content manager module 336 retrieves a content item in this manner, the index 314 can be updated.

In certain examples, the content items may be processed by a processing module 318. Prefetched content items may be preprocessed at a processing module of another computing device. The processing module 318 may process a content item to generate a derivative content item or processed version of the content item. Examples of processing that can be accomplished include filtering, graphical editing and/or processing, formatting a content item to be viewable on the computing device 300, etc. The processing module 318 may have capabilities based on software (e.g., applications 320) available on the computing device 300. For example, a computing device 300 without a graphical processing application may be unable to perform certain graphical processing of the content item.

In one example, the computing device 300 receives a request for a processed version of a content item stored at the computing device 300 via an interface 318. The request can be from one of the devices of the personal cloud that the computing device 300 belongs to. Further, the request can specify the content item. Further, the request can include profile information of the requesting device. In one example, the profile information includes formatting or device parameters that may affect the use of the content item when utilized by the requesting device. Additionally or alternatively, the profile information may be accessible by the computing device 300 via a data structure utilized by the devices manager module 332.

The metadata manager module 334 can then determine the location of the content item based on the index 314. The content item may be located at the computing device 300 or another device. If the content item is located at another device, the computing device 300 can retrieve the content item from the other device. Then, the processing module 318 can process the content item based on the profile information. The processing can include, for example, graphics processing of a display associated with the content item based on a display size or resolution of the requesting device. Once the processed version of the content item is generated, the input/output interface 316 of the computing device 300 can be caused to send the processed version of the content item to the requesting device.

FIG. 4 is a flowchart of a method for utilizing processing capabilities of a personal cloud, according to one example. Execution of method 400 can be performed by a computing device (e.g., computing device 200) or other suitable components for execution of method 400 can be utilized (e.g., computing device 300). Additionally, the components for executing the method 400 may be spread among multiple devices. Method 400 may be implemented in the form of executable instructions stored on a machine-readable storage medium and/or in the form of electronic circuitry.

Method 400 may start at 402 and proceed to 404, where a computing device determines a content item. The content item can be one of a plurality of content items respectively associated with devices of a personal cloud. As previously noted, an index of local metadata describing the content items can be updated and/or maintained at the computing device. The content item can be determined utilizing an application of the computing device or via a user interface allowing a user of the computing device to select the content item. The selection can be based on a presentation of metadata information of the content item or a set of the content items.

Then, at 406, the computing device determines a processing to be performed on the content item. The processing can be based on a profile of the device or be chosen for another purpose. For example, if the processing is based on a profile, the processing can be utilized to transform the content item for presentation at the computing device (e.g., formatted based on a sizing of a display of the computing device). Other processing can include, for example, graphics processing, such as red-eye removal or filtering information stored in the content item. The processing can be selected from a data structure such as a list of available processing options or a devices profile.

At 408, the computing device determines one of the devices of the personal cloud to retrieve a processed version of the content item from based on a devices profile that includes the respective capabilities of the devices. The device can be chosen because the device includes a capability to perform the selected processing to produce the processed version of the content item. As previously noted, the capabilities can include processing capabilities, software capabilities, power capabilities, combinations thereof, or the like. Further, the device may be determined because the device already includes the content item and there is no need for the determined device to retrieve the content item. The computing device can manage metadata describing the content items and the availability of the content items to determine whether the determined device includes the content item.

Scoring can be utilized to determine the device. In one example, a personal cloud module of the computing device determines respective scores for retrieving the processed version of the content item based on the metadata and the capabilities. For example, the devices of the personal cloud can be provided a score point if the device includes the content item. Additional score points can be provided if the device is plugged in or has a threshold amount of power remaining. Further, points can be provided for capabilities that can produce the processed version faster. Additionally, a device can be filtered if the device is incapable of producing the processed version. The determined device to request the processed version of the content item can thus be based on scoring.

A request for the processed version of the content item is then sent to the determined device. In certain scenarios, the request can include the type of processing to perform on the content item as well as other information that can be utilized for the processing (e.g., sections of the content item to process), in certain scenarios, the processed version of the content item can be based on profile information about the computing device (e.g., a size of a screen of the computing device, resolution of the computing device, ability of the computing device to present content, etc.). Thus, in certain scenarios, the profile information can be included in the request.

In certain examples, one device may include the content item and another device may have the capability to process the content item. In this scenario, other device can be sent the request for the processed version. The request can include the location of the content item, allowing the other device to quickly retrieve the content item. Additionally or alternatively, the device including the content item can be requested to send the content item to the other device.

At 410, the processed version of the content item can be received by the computing device. As such, the processed version of the content item may be determined at the computing device when received. The processed content item can then be provided to a requesting application or presented to a user. The method 400 then continues to 412, where the method 400 stops.

FIG. 5 is a flowchart of a method for providing processing capabilities for a personal cloud, according to one example. Execution of method 500 can be performed by a computing device (e.g., computing device 200) or other suitable components for execution of method 500 can be utilized (e.g., computing device 300). Additionally, the components for executing the method 500 may be spread among multiple devices. Method 500 may be implemented in the form of executable instructions stored on a machine-readable storage medium and/or in the form of electronic circuitry.

Method 500 may start at 502 and proceed to 504, where a computing device receives a request for a processed content item from one of the devices of the personal cloud that the computing device belongs to. The request can specify a content item associated with the devices of the cloud.

At 506, the computing device determines the location of the content item. The content item may be available at the computing device, be retrievable from the personal cloud, included with the request, etc. Further, an identifier of the content item can be included in the request. A metadata manager module can be utilized to determine the location from an index stored on the computing device based on the identifier.

In one example, the metadata manager module determines the location of the content item is at another one of the devices of the personal cloud that includes the content item. An interface (e.g., a networking module) of the computing device can then request the content item from the other device. The content item is then received from the device.

At 508 a processing module of the computing device is caused to process the content item based on profile information of the requesting device to generate the processed content item. The profile information can be determined from a devices manager module or be included in the request. The processing module can utilize a capability (e.g., a software processing capability, a hardware capability, etc.) to process the content item into the processed content item.

In one example, the profile information includes an ability of the requesting device to present content. As such, the processed version of the content item can be formatted based on the ability. For example, the requesting device may request a video content item associated with a first coding mechanism. The profile information may specify that the requesting device may be capable to present content using another coding mechanism. The processing module can process the video content item to the other coding mechanism. In this manner a derivative video content item is generated. This derivative content item can be stored at the computing device and linked to the content item in the metadata index.

At 510, the interface is caused to transmit the processed version of the content item (e.g., the derivative content item) to the requesting device. In one embodiment, a devices manager module of the computing device processes the content item for other devices and stores the other processed content item(s) in a cache at 512. The devices manager module can determine a form factor or other profile information that is associated with other devices in the personal cloud. The processing module then processes the content item based on the form factor or other profile information to generate another processed version of the content item. The other processed version of the content item is then stored in a memory (e.g., a cache) of the content. The method 500 then continues to 514, where the method 500 stops.

FIG. 6 is a flowchart of a method for prefetching content items from a personal cloud, according to one example. Execution of method 600 can be performed by a computing device (e.g., computing device 200) or other suitable components for execution of method 600 can be utilized (e.g., computing device 300). Additionally, the components for executing the method 600 may be spread among multiple devices. Method 600 may be implemented in the form of executable instructions stored on a machine-readable storage medium and/or in the form of electronic circuitry.

Method 600 may start at 602 and proceed to 604, where the computing device determines a usage pattern of a use of the computing device. The usage pattern can be based on the use of a user of the computing device or of the other devices in the personal cloud. As such, usage information may be shared among devices of the personal cloud. The usage pattern can be determined based on information collected by the respective devices.

At 606, the computing device determines a set of content items to prefetch based on the usage pattern. In one example, if a content item is recently accessed at one device or multiple devices of the personal cloud, it may be extrapolated that the user may wish to utilize the content item at the computing device. Other extrapolations can be made based on various usage patterns.

At 608, the computing device may determine devices that include the content items utilizing a metadata manager module. The computing device can then retrieve the content items from respective devices to store in a cache at 610. If multiple devices include the respective content items, the content items can be retrieved based on criteria (e.g., a user preference profile). For example, a desktop computer with broadband Internet access may be considered a better source to obtain content items from than a cellular device. To retrieve the respective content items, the computing device can request the content items and receive the content items from respective devices. Further, the content items can be processed (e.g., based on a profile of the computing device or based on a request). The processed content items can additionally be cached.

At 612, the computing device can receive a request for a content item. The request may be made by a program (e.g., an application) of the computing device, via a user interface, or the like. In one scenario the content item is within the set of content items or processed versions of content items cached. In this scenario, at 614, the requested content item (e.g., an unprocessed content item or a processed content item) is provided to the program or via user interface to the user.

In certain examples, the computing device can determine that the content item is not within the cached set or otherwise locally available on the computing device. In this scenario, the content item can be requested, e.g., via method 400, from one of the devices of the personal cloud. As such, the content item can be requested based on the determination that the content item is not within the cached set. Then the method 600 continues to 616, where the method stops.

Figure 7:
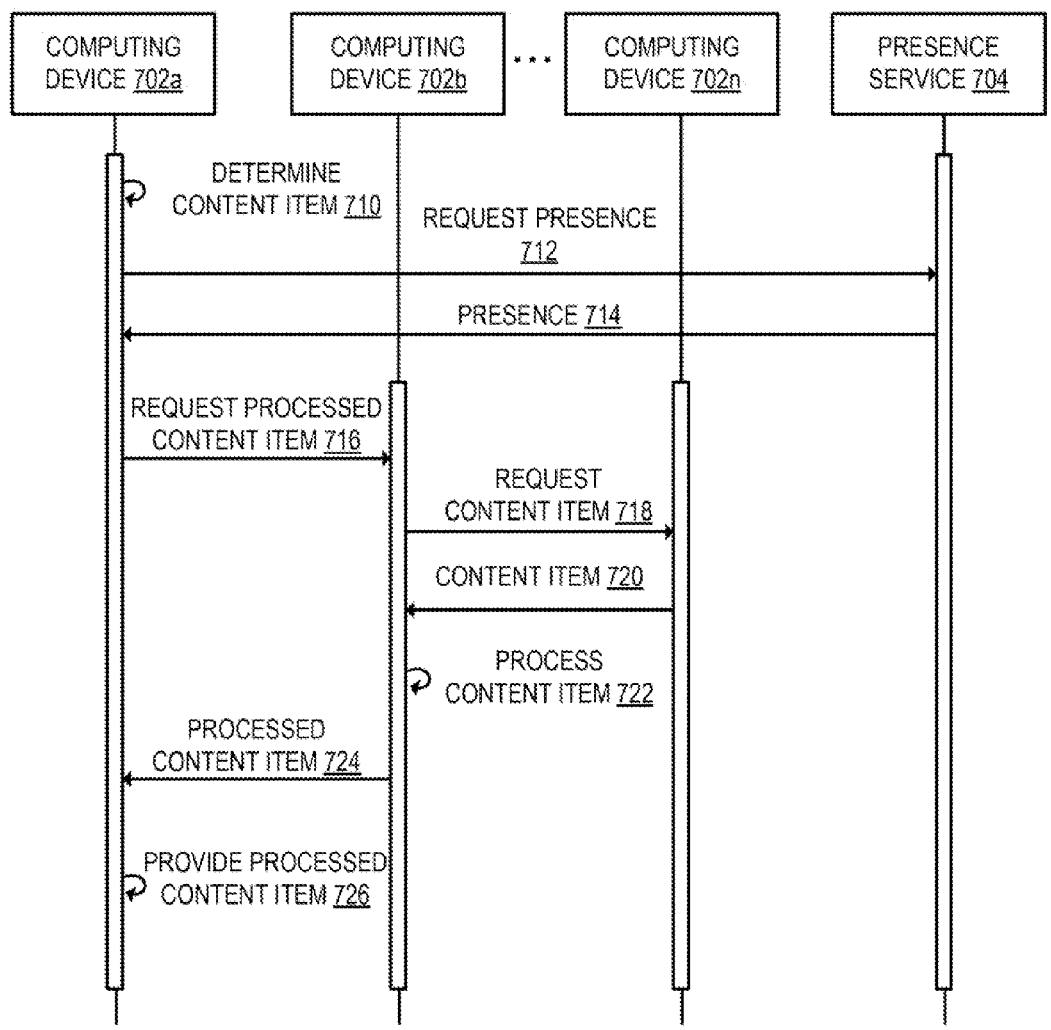
FIG. 7 is a ladder diagram of devices of a personal cloud processing capabilities of the personal cloud, according to one example.

FIG. 7 is a ladder diagram of devices of a personal cloud utilizing processing capabilities of the personal cloud, according to one example. The processes of the ladder diagram 700 may be executed based on computing devices 702a-702n and the presence service 704. Further, processes of the ladder diagram 700 may be implemented in the form of executable instructions stored on a machine-readable storage medium and/or in the form of electronic circuitry.

At 710, a first computing device 702a determines a content item to utilize. The determination can be made, for example, by a selection by a user via a user interface, a request by an application via an API, etc. The determination can determine, for example, that a certain processing should be performed on the content item for use at the first computing device 702a.

At 712, the first computing device 702a requests from a presence service 704 the location and/or availability computing devices of the personal cloud. The presence service 704 responds with presence information at 714. A devices manager module of the first computing device can be utilized to determine that a second computing device 702b has the ability to process the content item and is available for requesting the processed version of the content item. The second computing device 702b can be selected based on criteria (e.g., scoring) to be utilized to retrieve the processed content item. The first computing device then requests, at 716, the processed content item from the second computing device 702b.

The second computing device 702b receives the request and determines a location of the content item from a metadata manager module. The second computing device 702b can utilize the presence service 704 to update its presence information. The content item can be located on the second computing device 702b, the first computing device 702a, or a third computing device 702n. If the second computing device 702b determines that the third computing device 702n includes the content item, at 718, the second computing device 702b requests the content item from the third computing device 702n. The third computing device 702n receives the request, finds the content item, and returns the content item via a message at 720.

The second computing device 702b receives the content item and processes the content item to generate the processed content item via a capability of the second computing device 702b at 722. The processed content item is then sent to the first computing device 702a at 724. Once received at the first computing device 702a, a personal cloud module of the first computing device can provide the processed content item at 726 to a requester of the processed content item (e.g., a user or an application).

What is claimed is:

1. A non-transitory computer-readable storage medium storing instructions that, if executed by a processor of a user device, cause the processor to:

determine, by the processor of the user device, one content item of a plurality of content items respectively associated with a plurality of devices of a cloud, the one content item being stored on a storage computing device of the plurality of devices;

determine a processing to be performed on the one content item;

determine a processing computing device of the plurality of devices to retrieve a processed version of the one content item from based on a devices profile including respective capabilities of the devices;

request the processed version of the one content item from the processing computing device, the request including:
    causing the processing computing device to determine a location of the one content item among the plurality of devices as the storage computing device;
    causing the processing computing device to retrieve the one content item from the storage computing device; and causing the processing computing device to perform the processing on the one content item;
receive, by the user device, the processed version of the one content item from the processing computing device;
manage metadata describing the content items and the availability of the content items on the devices;
determine respective scores for retrieving the processed version of the one content item based, at least in part, on the metadata and the capabilities for the respective devices, wherein the determination of the processing computing device is based on the respective scores; and
transmit a request to the processing computing device to for the processed version.

2. The non-transitory computer-readable storage medium of claim 1, further comprising instructions that, if executed by the processor, cause the processor to:
update a local index store of metadata describing the content items and the availability of the content items on the devices, wherein the processing computing device is determined because the processing computing device includes a capability to produce the processed version, includes the one content item, or a combination thereof.

3. The non-transitory computer-readable storage medium of claim 1, wherein the respective capabilities include processing capabilities, software capabilities, power capabilities, or a combination thereof.

4. The non-transitory computer-readable storage medium of claim 1, wherein the processed version is based on profile information of the device.

5. The non-transitory computer-readable storage medium of claim 4, wherein the profile includes a size of a screen of the device, an ability of the device to present the content, or a combination thereof.

6. The non-transitory computer-readable storage medium of claim 4, further comprising instructions that, if executed by the processor, cause the processor to: transmit a request for the one content item to the processing computing device, wherein the request includes the profile information.

7. A processing computing device comprising:
a processing module;
an interface to receive a request for a processed content item, from a user device of a plurality of devices of a cloud that the computing device belongs to, the request specifying one content item of a plurality of content items respectively associated with the plurality of devices, the request being based on a score based, at least in part, on metadata and capabilities for the processing computing device; and
a metadata manager module to, in response to the request, determine the location of the content item at a storage computing device of the plurality of devices based on a local index of metadata describing the content items and availability of the content items on the plurality of devices,
wherein the processing module is caused to retrieve the one content item from the storage computing device and to process the one content item based on profile information of the user device to generate the processed content item, and
wherein the interface is caused to transmit the processed content item to the user device.

8. The computing device of claim 7, further comprising: a metadata manager module to determine another one of the devices that includes the one content item based on the metadata, wherein the interface is caused to request the one content item from the other one device, and wherein the interface receives the one content item.

9. The computing device of claim 7, wherein the profile information includes an ability of the one device to present content, wherein the processed version of the one content item is formatted based on the ability.

10. The computing device of claim 7, further comprising:
a devices manager module to determine a form factor for another one of the devices, wherein the processing module is caused to process the one content item based on the form factor to generate another processed version of the one content item; and
a content cache to store the other processed version of the one content item.

11. A method comprising:
updating, at a user device, a local index of metadata describing a plurality of content items respectively associated with a plurality of devices of a cloud;
determining one of the content items;
determining a type of processing to be performed;
determining a storage computing device of the plurality of devices of the cloud, based on the metadata, that includes the one content item;
determining a processing computing device of the plurality of devices of the cloud based on a profile of the user device that indicates that the processing computing device includes the processing type, the determining of the processing computing device being based on a score for retrieving the processed version of the one content item based, at least in part, on the metadata and the capabilities for the processing device;
sending a request to the processing computing device for a processed version of the one content item, the request causing the processing computing device to:
determine a location of the one content item among the plurality of devices as the storage computing device;
retrieve the one content item from the storage computing device;
perform the processing on the one content item; and
receiving a processed version of the one content item from the processing computing device.

12. The method of claim 11, further comprising:
determining a usage pattern of a user of the user device;
determining a set of the content items based on the usage pattern;
retrieving the set from at least one of the devices to store in a cache;
receiving a request for the one content item; and
determining that the one content item is not within the cached set, wherein the requesting of the one content item based on the determination that the content item is not within the cached set.

13. The method of claim 11, further comprising: determining a usage pattern of a use of the device, wherein the one content item is determined based on the usage pattern.

14. The method of claim 13, further comprising:
prefetching the processed version of the one content item;
caching the processed version of the one content item;
receiving a request for the one content item from a program of the user device; and
providing the one content item from the cache.

* * * * *